United States Patent
Brosnan (12)

(10) Patent No.: US 6,471,931 B1
(45) Date of Patent: Oct. 29, 2002

(54) PROCESS FOR RECYCLING SPENT POT LINER

(75) Inventor: Denis A. Brosnan, Clemson, SC (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 09/443,919

(22) Filed: Nov. 19, 1999

Related U.S. Application Data

(60) Provisional application No. 60/109,206, filed on Nov. 20, 1998.

(51) Int. Cl.⁷ .............................................. C01B 31/36
(52) U.S. Cl. ...................... 423/345; 205/372; 205/549
(58) Field of Search ................. 423/345, 346; 75/10.27; 205/549, 555, 372

(56) References Cited

U.S. PATENT DOCUMENTS

| | | | |
|---|---|---|---|
| 4,534,948 A | * 8/1985 | Baney | ........................ 423/345 |
| 4,873,070 A | 10/1989 | Kaji et al. | |
| 4,973,464 A | * 11/1990 | Rickman | ..................... 423/461 |
| 5,178,847 A | * 1/1993 | Judin et al. | .................. 423/344 |
| 5,222,448 A | 6/1993 | Morgenthaler et al. | |
| 5,286,274 A | * 2/1994 | Lindkvist et al. | ........... 75/10.48 |
| 5,525,556 A | * 6/1996 | Dunmead et al. | .............. 501/92 |
| 5,955,042 A | 9/1999 | Barnett et al. | |
| 6,022,515 A | 2/2000 | Stole et al. | |

* cited by examiner

Primary Examiner—Steven Bos
Assistant Examiner—Edward M. Johnson
(74) Attorney, Agent, or Firm—Dority & Manning, P.A.

(57) ABSTRACT

The process includes the steps of combining silica with the spent pot liner in order to convert a majority of the spent pot liner into silicon carbide. Specifically, the silica reacts with carbon in the spent pot liner to form silicon carbide. In order to form the silicon carbide, the materials are heated, such as in an electric resistance heater. The formed silicon carbide is free of contaminants and can be used for many useful purposes.

19 Claims, No Drawings

PROCESS FOR RECYCLING SPENT POT LINER

RELATED APPLICATIONS

The present application is based on a provisional patent application having Ser. No. 60/109,206 filed Nov. 20, 1998.

BACKGROUND OF THE INVENTION

In the past, various attempts have been made to treat and/or recycle spent potlining from aluminum reduction cells. For instance, U.S. Pat. No. 5,286,274 to Lindkvist, et al., which is incorporated herein by reference in its entirety, is directed to a method for the treatment of potlining residue from primary aluminum smelters. Lindkvist, et al. is directed to supplying a closed electrothermic smelting furnace with crushed spent pot liner and an $SiO_2$ source. The spent pot liner residue after oxidation is melted at temperatures from 1,300° C. to 1,750° C. Other additions to the smelting furnace include an oxidation agent to oxidize carbon and other oxidizable components such as carbide along with a source of calcium oxide to react with all the flourine present to form $CaF_2$, calcium almuniate or calcium aluminate silicate slag.

Various deficiencies and drawbacks, however, remain in the prior art regarding the recycling of spent pot liner. In particular, many processes are simply not well suited to removing all of the impurities contained within the waste materials in order to produce a viable product. Also, many prior art processes produce waste by-products that must be subsequently treated. The present invention addresses these and other disadvantages of the prior art and provides various improvements as will be made apparent from the following description.

SUMMARY OF THE INVENTION

The present invention recognizes and addresses the foregoing disadvantages and others of the prior art. Accordingly, it is an object of the present invention to provide an improved process for recycling spent pot liner, especially pot liner obtained from aluminum electrolytic cells.

Another object of the present invention is to provide a process for recycling spent pot liner by converting the carbon contained in the pot liner to silicon carbide.

Still another object of the present invention is to provide a process for recycling spent pot liner that not only converts carbon into silicon carbide, but also decomposes flourine containing compounds and cyanates.

These and other objects of the present invention are achieved by providing a process for recycling spent pot liner obtained from aluminum electrolytic cells. The spent pot liner can contain various materials, depending upon the conditions under which the pot liner was used. For most applications, the pot liner will contain carbon, cryolite ($Na_3AlF_6$), cyanide compounds including sodium cyanate and/or potassium cyanate, silica, various metals including aluminum, iron and magnesium, aluminum oxide, besides various other materials.

According to the process of the present invention, the spent pot liner is first comminuted using, for instance, a crushing device. For most applications, the spent pot liner should be comminuted to an extent such that at least 90 percent of the particles by volume have a diameter of less than about 1 millimeter.

After being comminuted, the spent pot liner is then combined with silica. The silica can be added in an amount such that the molar ratio between the total silica present in the pot liner and carbon is from about 1:3 to about 1:5, and particularly from about 1:3 to about 1:4. The silica that is combined with the pot liner can be obtained from various sources. For instance, silica can be added to the spent pot liner as sand, fumed silica, fly ash, clay, and/or metal silicones.

The spent pot liner and silica are then heated under conditions that promote the formation of silicon carbide. For example, preferably the carbon and silica are heated by an electrical resistance furnace in a reducing atmosphere and in an oxygen starved atmosphere. As used herein, an oxygen starved atmosphere refers to an atmosphere containing less than 5 percent molecular oxygen. For most applications, the spent pot liner and silica are heated to a temperature of at least 1800° C., and particularly from about 1800° C. to about 2200° C.

During formation of silicon carbide, flourine containing compounds and cyanides will decompose and exit the furnace in the flue gas stream. It is believed that for most applications, flourine will volatilize and reform in the flue gas stream as hydroflouric acid which can then be recovered from the flue gas stream using an appropriate wet or dry scrubber.

After heating, the formed silicon carbide can be separated from the remainder of any other materials and reused as desired. In order to separate the silicon carbide from the other materials, various processes can be used, such as gravimetric separation techniques.

Other objects, features and aspects of the present invention are discussed in greater detail below.

DETAILED DESCRIPTION OF PREFERRED EMBODIMENTS

It is to be understood by one or ordinary skill in the art that the present discussion is a description of exemplary embodiments only, and is not intended as limiting the broader aspects of the present invention, which broader aspects are embodied in the exemplary constructions.

The present invention is directed a process for recycling "spent Pot Liner" or SPL by a process of comminution of the SPL followed by mixing with sand and other additives in appropriate proportions and further followed by heating to form the mineral silicon carbide (SiC) which is also known as "carborundum". The product of this process is a granular synthetic mineral of substantial silicon carbide content. Silicon carbide and associated minerals are a valuable commodity in commerce with many useful applications in metallurgical applications (as an additive in foundry applications), in abrasive grit and as a raw material for bonded abrasive products, and as a refractory admixture for use in wearing or structural ceramics. Other uses are expected along the lines of commercially manufactured silicon carbide.

Spent pot liner for use in the process of the present invention can come from various sources. In general, spent pot liner is produced as a waste product during the manufacture of aluminum metal. In particular, aluminum is generally produced through the electrolysis of alumina ($Al_2O_3$). In this process, alumina is dissolved in a molten cryolite ($Na_3AlF_6$) bath. An electric current is then passed through the bath causing the aluminum to separate from the oxygen. During the process, a carbon anode is used which becomes consumed leaving behind a waste product.

Thus, spent pot liner is typically primarily composed of carbon. Besides carbon, however, spent pot liner usually contains other ingredients that are hazardous by definition. In particular, spent pot liner can contain unused cryolite, which is considered hazardous due to its flourine content, and cyanide and cyanide salts, which are also considered hazardous. Cyanide salts that are typically present in the spent pot liner include sodium cyanate and potassium cyanate. Further, spent pot liner can also contain alumina, silica, and metals, such aluminum, iron, magnesium, etc.

As described above, the primary purpose of the process of the present invention is to convert the carbon contained within the spent pot liner into silicon carbide by adding a silica source to the pot liner. The chemical equation for converting carbon into silicon carbide according to the present invention is as follows:

$$SiO_2 + 3C = SiC + 2CO$$

Of particular advantage, it has been discovered that the sodium and flourine contents of the spent pot liner actually assist in purifying the silicon carbide product in much the same manner as rock salt is now used in producing silicon carbide from coke and silica sand.

Further, the extreme process heat decomposes the cyanide constituent or renders it in a form which can be thermally oxidized in a downstream air pollution control device. The cyanide constituent, during liberation, provides for a porosity in the mass being converted to silicon carbide and thereby facilitates the separation of the silicon carbide grains at the completion of the process (as do other volatile components). The aluminum oxide content of the SPL further contributes to the separation of the silicon carbide grains on completion of the process. Standard gravimetric techniques may be employed to separate silicon carbide, aluminum oxide, and unreacted carbon at the end of the process if necessary.

It is believed that the silicon carbide produced according to the present invention meets all of the criteria for recycling under the Resource Conservation and Recovery Act—a Public Law of the United States. The silicon carbide produced is a viable product that can be used in many different and diverse applications. The product should meet all applicable land band treatment standards (leaching), because the flourine species has been removed (and captured in air pollution control equipment) and cyanide has been destroyed. Further, any excess carbon or unreacted materials that are left over from the process can be recharged to the next batch and processed accordingly.

It is well known in the art that silicon carbide is not a naturally occurring material. Silicon carbide has been manufactured since the turn of the century by mixing silicon dioxide (sand) and a carbon source and heating to temperatures exceeding red heat. The preferred source of carbon is coke (a calcined version of coal or a petroleum residue). Heating is usually accomplished in an electric resistance furnace where electricity is passed through the furnace charge (called an Acheson furnace). However, other types of furnaces may be employed to form silicon carbide. The quality of the silicon carbide is determined by the extent of heating as the "beta" crystalline form is produced by exposure to temperatures below about 1800° C. and the alpha crystalline form is produced by exposure to temperatures exceeding about 1800° C.

Acheson furnaces are commonly employed in the manufacture of synthetic graphite articles of commerce such as electrodes. Such furnaces are described in the *Handbook of Industrial Refractories Technology* by Carniglia and Barnes (Noyes Publications, pp. 62—62, 1992) which is incorporated herein by reference.

The use of resistive heating to form silicon carbide is described in the "Material Handbooks", Ceramic Industry Magazine, January, 1997 (pp. 147–148) which is also incorporated herein by reference. Other references that disclose a process for producing silicon carbide from carbon include U.S. Pat. Nos. 492,767, 3,306,705, 4,659,022 and 5,190,737, which are all incorporated herein by reference.

Silicon carbide is an extremely hard material, having a high thermal conductivity. The material has a particularly high strength at elevated temperatures and does not melt at normal pressures. The material is a semiconductor and is capable of rectification and electroluminescence. Vitrification does not occur as a major process in the production of silicon carbide with solid and gas phase reactions predominating.

The present invention is very useful in solving a world wide hazardous waste disposal problem by recycling the spent pot liner. The safety of the silicon carbide product is assured since hazardous flourine and cyanide compounds are separated from the product. Other advantages of the process will be recognized by those skilled in the art.

One process according to the present invention will now be described in detail. In accordance with the present invention, the first step in the process is to collect spent pot liner and, if necessary, comminute the material. In order to comminute the material, various equipment and devices can be used, including all different types of crushers. For example, a jaw crusher or an attrition crusher may be used.

In general, it will be advantageous to crush the pot liner into particle sizes as small as possible. Large chunks of carbon, however, may remain in the feed materials. In general, at least 90 percent of the particles by volume should have a diameter of less than about 1 millimeter.

After or before the materials are comminuted, a source of silica can be combined with the materials in order to later promote the production of silicon carbide. As shown by the above equation for producing silicon carbide, it generally takes 1 mole of silica and 3 moles of carbon to produce 1 mole of silicon carbide. Further, it has been discovered that it is generally advantageous to have excess carbon present during the process. For example, excess carbon will maintain a reducing environment within the reactor which promotes the formation of silicon carbide and is more conductive than silica. Thus, silica should be added to the spent pot liner in an amount so that the molar ratio between the total silica present and the total carbon present should be from about 1:3 to about 1:5, and particularly from about 1:3 to about 1:4.

The silica that is added to the spent pot liner can be added in the form of various materials. For instance, the source of silica combined with the spent pot liner can be in the form of sand, fumed silica, fly ash, clay, metal silicones, and the like.

After the silica is mixed with the spent pot liner, the mixture is heated to a temperature sufficient for the silica to react with the carbon to form silicon carbide. For most applications, the mixture should be heated to a temperature of at least 1800° C., and particularly from about 1800° C. to about 2200° C. It is believed that higher temperatures can also be attained, such as from 1800° C. to about 2500° C.

It is also believed that various heating devices can be used in order to promote the reaction. In one preferred embodiment, however, an electric resistance furnace is used, which heats the materials by passing an electric current through the materials.

During heating, various conditions should be maintained in order to promote the reaction of carbon with silica to form mixed silicon carbide. For instance, preferably a reducing atmosphere is present within the furnace. Also, preferably the process takes place in a starved oxygen atmosphere, which means that oxygen is present within the atmosphere in an amount of less than 5 percent, and particularly less than 3 percent. If high amounts of oxygen are present within the furnace, carbon may react with the oxygen to form carbon oxides instead of silicon carbide.

Of particular advantage, during heating, flourine compounds present within the spent pot liner and cyanide and cyanide salts present within the pot liner will decompose and exit the furnace with the flue gas. In particular, it is believed that flourine will vaporize and reform as hydroflouric acid within the flue gas. The hydroflouric acid can then be easily removed from the flue gas using a wet or dry scrubber. For example, the flue gas can be contacted with water which will collect the hydroflouric acid. Alternatively, a dry scrubber can be used containing, for instance, alumina, which will react with the hydroflouric acid and form flourine salts, such as aluminum flouride.

The cyanide and cyanide salts, on the other hand, will completely decompose or will be converted into a form that can be thermally oxidized. In this regard, preferably a thermal oxidizer is placed in communication with the flue gas stream for ensuring that the cyanide components are completely broken down and decomposed.

One particular advantage of the present invention is that flourine and metals, such as sodium and potassium, contained within the pot liner facilitate formation of the silicon carbide. In particular, the presence of flourine and sodium will purify the end product by volatilizing those impurities that may be present in the spent pot liner.

During the process of the invention most of the carbon contained within the spent pot liner will be converted to silicon carbide. For instance, it is believed that the process will convert at least 50 percent of the carbon into silicon carbide, and for most applications, will convert at least 80 percent of the carbon contained in the spent pot liner into silicon carbide.

After heating, the final product will contain silicon carbide and will most likely contain other materials, such as aluminum oxide and unreacted carbon. Preferably, the silicon carbide is then separated from the remainder of the materials and used as desired. The other materials, on the other hand, can be collected and reused as desired or can be combined with further amounts of spent pot liner and reprocessed according to the present invention.

The silicon carbide can be separated from the other materials using various techniques. In one embodiment, for instance, the resulting end product can be comminuted or crushed and then fed through a gravimetric separation process for separating the silicon carbide from the remainder of the material due to density differences. For instance, one example of a gravimetric separation technique is a process known as tabling. It should be understood, however, that various other techniques are available, which are well known in the art.

As described above, the resulting silicon carbide collected from the process has many useful uses and applications in various industries. For instance, the silicon carbide can be used for refractory purposes such as seller tile and kiln furniture. Silicon carbide is also being used in great amounts in electrical devices such as lightning arrestors, heating elements and non-linear resistors. Further, silicon carbide is also well suited for use as an abrasive grit.

These and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention.

What is claimed is:

1. A process for recycling spent pot liner obtained from an aluminum electrolytic cell comprising the steps of:

comminuting spent pot liner, said spent pot liner containing carbon;

combining said spent pot liner with silica, said silica being added in an amount such that the molar ratio of silica to carbon present in said pot liner is from about 1:3 to about 1:5;

heating said spent pot liner and silica in an electric resistance furnace in a reducing atmosphere to a temperature sufficient for said silica to react with said carbon to form silicon carbide; and separating said formed silicon carbide from the remaining heated spent potliner.

2. A process as defined in claim 1, wherein at least 50 percent of the carbon contained in the spent pot liner is converted into silicon carbide.

3. A process as defined in claim 1, wherein at least 80 percent of the carbon contained in the spent pot liner is converted into silicon carbide.

4. A process as defined in claim 1, wherein said spent pot liner is comminuted into particles to an extent such that at least 90 percent by volume of the particles have a mean diameter of less than 1 millimeter.

5. A process as defined in claim 1, wherein the silica that is added to the spent pot liner is added in the form of a material selected from the group consisting of sand, fumed silica, fly ash, clay, a metal silicone, and mixtures thereof.

6. A process as defined in claim 1, wherein said spent pot liner and silica are heated to a temperature of at least about 1800° C.

7. A process as defined in claim 1, wherein said spent pot liner further contains a flourine compound, said flourine compound being decomposed during said heating step releasing a flue gas containing flourine, said flourine being collected.

8. A process as defined in claim 1, wherein said spent pot liner further comprises a cyanide, said cyanide being decomposed during said heating step.

9. A process as defined in claim 1, wherein said silicon carbide and said remaining heated spent pot liner are separated through a gravimetric process.

10. A process for recycling spent pot liner comprising the steps of:

providing spent pot liner, said spent pot liner containing carbon;

combining said spent pot liner with silica, said silica being added in an amount such that the molar ratio of silica to carbon present in said pot liner is from about 1:3 to about 1:5;

heating said spent pot liner in a reducing atmosphere to a temperature sufficient for said silica to react with said carbon to form silicon carbide, said temperature also being sufficient to decompose any compounds containing fluorine and any cyanates present within said spent pot liner; and cooling and collecting said produced silicon carbide.

11. A process as defined in claim 10, wherein said spent pot liner is heated to at least 1800° C.

12. A process as defined in claim 10, wherein said spent pot liner is heated to a temperature of from about 1800° C. to about 2200° C.

13. A process as defined in claim 10, wherein said spent pot liner is heated in electric resistance furnace.

14. A process for recycling spent pot liner comprising the steps of:

provi ding spent pot liner, said spent pot liner containing carbon, a fluorine compound and a cyanate;

combining said spent pot liner with silica, said silica being added in an amount such that the molar ratio of silica to carbon present in the spent pot liner is from about 1:3 to about 1:5;

heating said spent pot liner and silica in an electric resistance furnace in a reducing atmosphere, said spent pot liner and silica being heated to a temperature sufficient for said silica to react with said carbon to form silicon carbide, said temperature also being sufficient to decompose said fluorine compound and said cyanate, said fluorine contained in said fluorine compound being released as a vapor in flue gas exiting said electrical furnace;

collecting said fluorine in said flue gas; and separating said formed silicon carbide from the remaining heated spent pot liner.

15. A process as defined in claim 14, wherein said spent pot liner is heated to a temperature of from about 1800° C. to about 2200° C.

16. A process as defined in claim 14, wherein at least 80 percent of the carbon contained in the spent pot liner is converted into silicon carbide.

17. A process as defined in claim 14, wherein said flourine is collected from said flue gas using a scrubber.

18. A process as defined in claim 14, wherein said silicon carbide and said remaining heated spent pot liner are separated through a gravimetric process.

19. A process as defined in claim 14, further comprising the step of comminuting said spent pot liner prior to heating said spent pot liner.

* * * * *